Patented Oct. 4, 1932

1,880,459

UNITED STATES PATENT OFFICE

FRANK ELLIS MORRIS, OF PHILADELPHIA, PENNSYLVANIA, ASSIGNOR TO DOUGHNUT MACHINE CORPORATION, OF NEW YORK, N. Y., A CORPORATION OF NEW YORK

SUGARED DOUGHNUTS AND THEIR MANUFACTURE

No Drawing.  Application filed February 6, 1929.  Serial No. 338,039.

My invention relates to sugared doughnuts and the like, and is also concerned with their manufacture. As will appear hereinafter, my invention is particularly concerned with so-called "cake" doughnuts, in which lightening is effected by gases evolved or formed during the cooking, as distinguished from raised doughnuts, in which lightening is mainly effected prior to cooking, by gases evolved during an antecedent "proofing", as it is termed.

As is well known, cake doughnuts are made by frying formations of dough (generally annular) in hot cooking oil, grease, or fat. The steam and other gases formed during the cooking give the doughnut a cellular structure. In escaping from the doughnut, these gases break through the walls of the cells from the interior of the doughnut outward, so that the doughnut has virtually continuous pores leading in from its surface to its center. When the doughnut is removed from the cooker, the escape of hot gases ceases; and as the doughnut cools, the gases remaining in the doughnut contract and even condense and a vacuum is formed in the pores, so that the grease clinging to the surface is drawn into the pores (as well as a quantity of air), leaving the doughnut with an apparently "dry", non-greasy surface. The doughnut is then usually sprinkled with powdered sugar. The grease seems not to penetrate the doughnut more than a short distance, and does not seal its pores. Apparently, the grease remains clinging to the walls of the pores close to the exterior.

As the surface of the doughnut remains porous, and as the powdered sugar has a decided affinity for grease, the grease in the pores of the doughnut is drawn out to the surface and saturates the sugar, discoloring it and giving the doughnut an unsightly, greasy appearance. Also, the air has free passage to and from the interior of the doughnut, and the water in the doughnut dries out to a greater or less extent. Within forty-eight hours after cooking, the doughnut becomes stale, and its flavor greatly deteriorated.

I have discovered a way of avoiding these drawbacks of present practice, by suitably coating the doughnut or sealing its pores. This may be done as follows:

Instead of dusting the doughnut with powdered sugar, I may employ a syrup consisting of a solution and/or thin mixture of powdered sugar in water,—virtually an uncooked icing, but rather thinner than usual for icing. As the doughnut comes from the cooker,—almost immediately or a few seconds after the grease has soaked in and disappeared from its surface as above described,—I drop the doughnut into this syrup for a few seconds, and then withdraw it and allow it to drain and dry. The syrup adhering to the doughnut is partly drawn into its outer pores (by the vacuum formed in them as the doughnut cools), and partly remains on its surface. As a result, the pores of the doughnut are sealed and a very thin, clear film or coating of sugar is left on it,—a coating so thin, indeed, that it shows no tendency to crack or peel. (As the sugar penetrates the shell of the doughnut, some cracking or peeling off of the external excess is not really objectionable.) Within the cells of the doughnut structure there is a relatively thicker layer of sugar, which together with the superficial film gives the doughnut a very agreeable sweetening. The penetration of the sugar into the doughnut is greatest in places where the shell of the doughnut is weakened, as by cracks in its crust: i. e., the action is self-adjusting and compensatory, giving the greatest sealing where most needed.

The quick sealing of the pores of the doughnut not only prevents contamination of the sugar with grease, but also prevents the doughnut from drying out, and keeps the air from penetrating it,—thus preventing or greatly retarding "staling" of the doughnut.

The quantity of sugar thus taken up by the doughnut can be controlled by the density of the solution or syrup, the time the doughnut is left submerged in it, and the time allowed to elapse between the removal of the doughnut from the cooking liquor and its submergence in the syrup. With a long delay, the vacuum formed in the pores of the doughnut as it cools is largely satisfied by air drawn into the pores, so that when the doughnut is submerged in the syrup, only a very small quantity of the latter can be drawn in. If, on the other hand, the doughnut is submerged in the syrup the very instant it is withdrawn from the cooking liquor, and the syrup is fairly heavy or viscous, then the doughnut structure can be almost filled with sugar; and if the syrup is quite thick, the doughnut may be collapsed by the external air pressure, owing to the very slow inflow of the sugar syrup to satisfy the vacuum in the pores.

The temperature of the syrup is also a means of controlling the thickness of the coating produced, because of its influence on the proportion of sugar initially in solution and on the viscosity of the syrup: i. e., if a thin coating is desired, the syrup bath should be somewhat warm; while for a thicker coating, it should be cool.

In practice, I secure good results by employing a syrup of finely powdered sugar mixed with water in the proportion of 80% sugar and 20% water, by weight. At ordinary temperatures, this solution is supersaturated: i. e., some of the sugar is not dissolved, but remains in suspension in the solution. However, when this super-saturated solution comes in contact with the hot doughnut, it is heated sufficiently to cause practically complete solution of the suspended sugar,—which for the strength of solution above indicated required a temperature of 176° F.,—so that a clear sugar glaze is produced on the doughnut. Also, the supersaturation of the solution results in a quick solidification of the syrup as the doughnut cools.

If sufficient water were used to dissolve the sugar completely when cold, then an adequate sugar coating could not be obtained without introducing an excessive amount of water into the doughnut, so as to render it unpalatable until the excess had dried out. This, however, would change the structure of the doughnut and render it less attractive. The super-saturation of the sugar solution gives a clear glaze without any such large amount of water being used.

The sugar syrup employed may be flavored and colored as desired. If a heavy coating is to be produced, any tendency for it to scale or peel off may be counteracted by various agents added to the syrup to toughen the film, such as egg albumen or gum arabic. Also, glucose or other difficultly crystallizable sugar may be added, or starch. Carbohydrates are particularly suitable, as they do not coagulate or otherwise deteriorate with heat; are safe and satisfactory as foods; tend to repel grease, and have (many of them) a toughening influence on the sugar coating.

Owing to the number of factors that influence the sugaring operation, as above explained, it is practically impossible to give specific directions as to length of immersion in the syrup, or as to how long to wait after taking the doughnut out of the cooker before introducing it into the syrup. However, a little experience will enable one to secure almost any results desired by observing the foregoing directions and carrying out the operation carefully.

Having thus described my invention, I claim:

1. As an article of manufacture, a cake doughnut having its skin substantially hermetically sealed with sugar all over the doughnut, against outward passage of grease, as well as against drying out.

2. As an article of manufacture, a cake doughnut coated all over, and thereby substantially hermetically sealed, with a sugar pellicle substantially impervious to grease from within the doughnut, as well as to the passage of air.

3. The method of sugaring a hot cake doughnut which comprises momentarily immersing it all over in a sugar solution, a short time after its withdrawal from the cooking grease, but while it is still hot, thus causing the solution to be drawn into the pores of the doughnut as the latter cools.

4. The method of sugaring a hot cake doughnut which comprises momentarily immersing it all over, after withdrawal from the cooking grease and while still hot, in a supersaturated but cooler sugar solution, so as to heat the liquid remaining on the doughnut after removal from the solution and cause solution of more sugar therein before precipitation of the sugar by cooling.

In testimony whereof, I have hereunto signed my name at New York city, New York, this 21st day of January, 1929.

FRANK ELLIS MORRIS.